(12) United States Patent
Sumesaglam et al.

(10) Patent No.: US 7,756,495 B2
(45) Date of Patent: Jul. 13, 2010

(54) HIGH SPEED RECEIVER

(75) Inventors: Taner Sumesaglam, Folsom, CA (US); Aaron K. Martin, El Dorado Hills, CA (US); William D. Kesling, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 1097 days.

(21) Appl. No.: 11/240,584

(22) Filed: Sep. 29, 2005

(65) Prior Publication Data

US 2007/0072568 A1 Mar. 29, 2007

(51) Int. Cl.
*H04B 1/16* (2006.01)
*H04B 17/00* (2006.01)

(52) U.S. Cl. .................. 455/130; 455/195.1; 455/226.1; 455/343.1

(58) Field of Classification Search .............. 455/67.11, 455/226.1, 296, 298, 323, 333, 67.13–67.14, 455/195.1, 264, 343.1; 341/118–121; 375/224
See application file for complete search history.

(56) References Cited

U.S. PATENT DOCUMENTS

| 5,355,391 | A |   | 10/1994 | Horowitz et al. |   |
|---|---|---|---|---|---|
| 5,359,652 | A |   | 10/1994 | Mulder et al. |   |
| 5,391,999 | A |   | 2/1995 | Early et al. |   |
| 5,606,320 | A |   | 2/1997 | Kelks |   |
| 5,731,772 | A | * | 3/1998 | Mikkola et al. | 341/118 |
| 5,867,012 | A |   | 2/1999 | Tuthill |   |
| 5,869,987 | A |   | 2/1999 | Tang |   |
| 5,977,798 | A |   | 11/1999 | Zerbe |   |
| 6,147,514 | A |   | 11/2000 | Shiratake |   |
| 6,313,779 | B1 |   | 11/2001 | Leung et al. |   |
| 6,400,778 | B1 |   | 6/2002 | Matui |   |
| 6,420,932 | B1 |   | 7/2002 | Casper |   |
| 6,556,154 | B1 |   | 4/2003 | Gorecki et al. |   |
| 6,653,893 | B2 | * | 11/2003 | Casper et al. | 330/9 |
| 6,724,248 | B2 | * | 4/2004 | Llewellyn | 330/9 |
| 6,798,260 | B1 | * | 9/2004 | Wittlinger | 327/157 |
| 6,965,262 | B2 | * | 11/2005 | Zerbe | 327/336 |
| 7,268,624 | B2 | * | 9/2007 | Chen et al. | 330/258 |
| 2003/0184459 | A1 | * | 10/2003 | Engl | 341/120 |
| 2004/0008052 | A1 | * | 1/2004 | Sakaguchi et al. | 324/765 |
| 2006/0061405 | A1 | * | 3/2006 | Zerbe | 327/336 |
| 2006/0067391 | A1 | * | 3/2006 | Garlepp | 375/224 |

OTHER PUBLICATIONS

Farjad-Rad, Ramin, et al., "0.622-8.0 Gbps 150mW Serial IO Macrocell with Fully Flexible Preemphasis and Equalization", 2003 Symposium on VLSI Circuits Digest of Technical Papers, 2003, pp. 63-66, 4-89114-034-8, Velio Communication Inc., Milpitas CA 95035 USA and Stanford University, Stanford CA 94305 USA.

(Continued)

*Primary Examiner*—Simon D Nguyen
(74) *Attorney, Agent, or Firm*—Blakely, Sokoloff, Taylor & Zafman LLP

(57) ABSTRACT

In one embodiment, a receiver includes a voltage margin controller, a set of first components coupled to the voltage margin control, and a set of offset compensation controllers coupled to the set of first components.

15 Claims, 9 Drawing Sheets

OTHER PUBLICATIONS

Laville, S., et al., "Integrated Offset Trimming Technique", 5 pages, Solid-State Circuits..Conference, 2001, Proceedings of the 27$^{th}$ European ESSCIRC, Sep. 18-20, 2001. pp 89-92+biblio page.

Lee, Ming-Ju Edward, et al., "Low-Power Area-Efficient High-Speed I/O Circuit Techniques", IEEE Journal of Solid-State Circuits, Nov. 2000, pp. 1591-1599, vol. 35, No. 11, 0018-9200/00094385, IEEE, Authors with Computers System Laboratory, Stanford University, Stanford CA 94035 USA.

Lovett, Simon J., et al., "Yield and Matching Implications for Static RAM Memory Array Sense-Amplifier Design," IEEE Journal of Solid-State Circuits, Aug. 2000, pp. 1200-1204, vol. 35, No. 8, IEEE S 0018-9200 00 064532, Cypress Semiconductor, San Jose CA USA.

Martin, Aaron, et al., "8Gb/s Differential Simultaneous Bidirectional Link with 4mV 9ps Waveform Capture Diagnostic Capability," IEEE International Solid-State Circuits Conference, 2003, Session 4: Clock Recovery and Backplane Transceivers, Paper 4.5, 10 pages, 0/7803-7707-Sep. 2003, Intel Labs, Hillsboro OR.

Sidiropoulos, Stefanos, et al., "Current Integrating Receivers for High Speed System Interconnects," 5 pages, Custom Integrated Circuits Conference, Publication Date: May 1-4, 1995, Proceedings of the IEEE, pp. 107-110+biblio page. ISBN 07803-2584-2. Published in Issue Aug. 6, 2002 20.02.31.0. Center for Integrated Systems, Stanford University, Stanford CA USA.

Teifel, John, et al., "A High-Speed Clockless Serial Link Transceiver," 12 pages, Ninth IEEE International Symposium on Asynchronous Circuits and Systems, p. 151. Computer Systems Laboratory, Electrical and Computer Engineering, Cornell University, Ithaca NY 14853 USA.

* cited by examiner

HIGH SPEED RECEIVER

TECHNICAL FIELD

Embodiments of the present invention relate to integrated circuit design, and more particularly to the design of input/output (I/O) circuits.

BACKGROUND

Transmitter circuits, receiver circuits and input/output (I/O) buses are used extensively in integrated circuits (ICs) both for inter-chip and off chip signaling. Transmitter circuits, receiver circuits and I/O buses are designed to send and/or receive binary data signals through a transmission line. These devices can be used, for example, in a computer's system bus, in internal busses and system bus interface units of a CPU, and in memory devices such as DRAM.

Integrated circuit devices having upwards of several hundred I/O lines and associated transmitter, receiver, and or transceiver circuits are common. A transceiver circuit can have a transmitter circuit for sending signals and a receiver circuit for receiving signals. Transmitter and receiver circuits can occupy considerable area on an integrated circuit. Additionally, each circuit consumes some quantity of power, and in the aggregate these circuits can have a considerable impact on the total power consumption of an integrated circuit.

Receiver circuits can have many digital to analog converters (DACs) in any number of components, such as in preamplifiers, variable offset comparators and latched amplifiers. Each DAC occupies an amount of chip area based on the bit size of the DAC. For example, a 4-bit DAC has $2^4$ (16) transistors and an 8-bit DAC has $2^8$ (256) transistors, each transistor occupying some unit area.

A receiver circuit that operates in a digital mode interprets received signals as a series of logic "1s" or logic "0s." The received signal has some amplitude, for example from 0 to 1 volt, depending on the circuit used. A half wave of the signal represents the amplitude half way between the maximum and the minimum possible amplitudes. For example, if the amplitude varies from 0 to 1 volt, then the half wave would be 0.5 volts. Voltages above the half wave are registered as having a logic "1" and voltages below the half wave are registered as having a logic "0." Signals can become corrupted before they reach the receiver. When a signal is corrupted, its amplitude at the receiver can be different from its amplitude at a transmitter. Therefore, signals that should be registered as having a logic "1" might be registered as logic "0," and signals that should be registered as having a logic "0" might be registered as logic "1."

After fabrication, receiver circuits need to be tested to ensure that minimal transmission errors will occur during device operation. Such testing is referred to as margining.

BRIEF DESCRIPTION OF THE DRAWINGS

Features and advantages of embodiments of the present invention will be apparent upon reading the following detailed description in conjunction with the accompanying drawings and appended claims provided below, where:

DETAILED DESCRIPTION

In the following description numerous specific details are set forth. One of ordinary skill in the art, however, will appreciate that these specific details are not necessary to practice embodiments of the invention. While certain exemplary embodiments of the invention are described and shown in the accompanying drawings, it is to be understood that such embodiments are merely illustrative, and are not restrictive of the current invention. Embodiments of this invention are not restricted to the specific constructions and arrangements shown and described, because modifications may occur to those ordinarily skilled in the art.

Figure 1A:
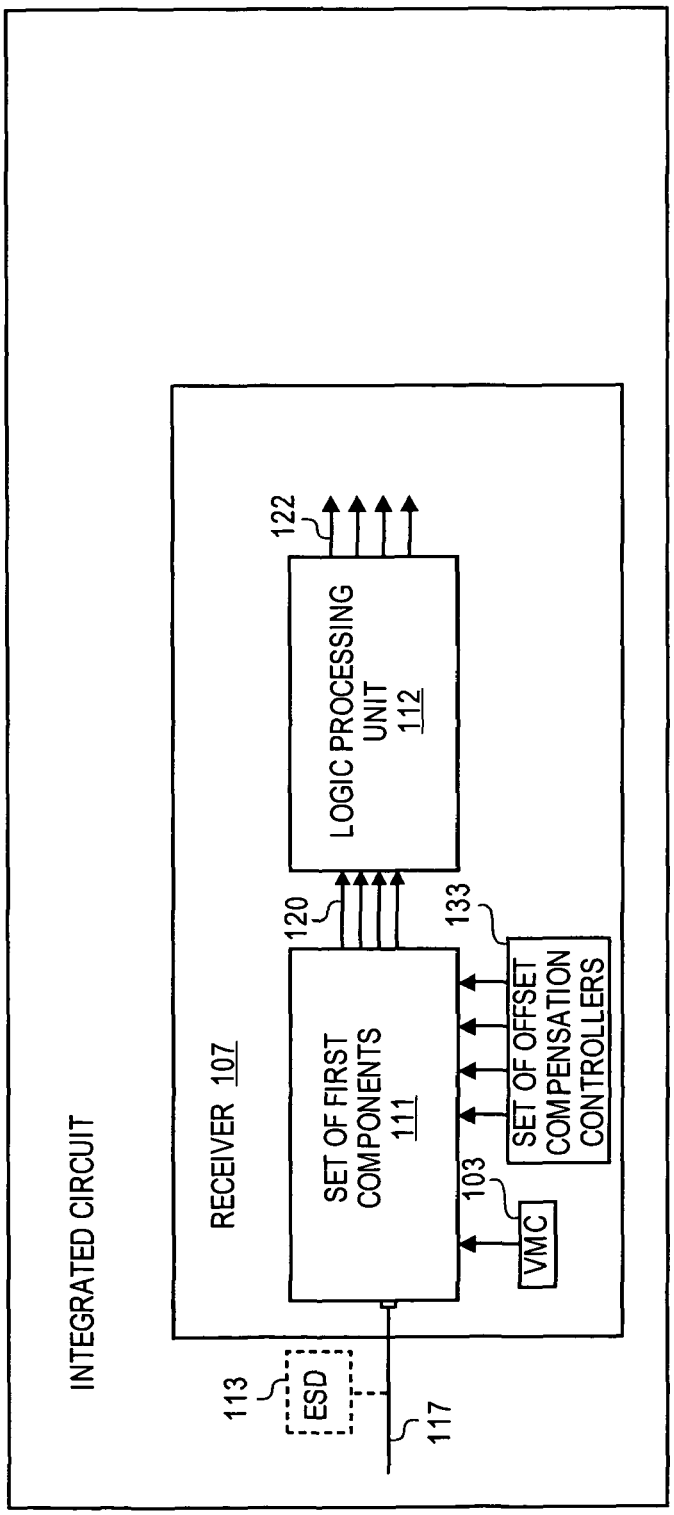
FIG. 1A is a block diagram of an integrated circuit in accordance with one embodiment.

FIG. 1A is a block diagram illustrating an integrated circuit 101 in accordance with one embodiment of the present invention. The integrated circuit 101 may include a receiver 107 for receiving signals. In one embodiment, the receiver 107 receives on chip signals. In alternative embodiments, the receiver 107 receives off chip signals and/or on chip signals. In one embodiment, the receiver employs differential signaling. In differential signaling, signals are represented with a signal pair, the difference of which represents the voltage value of the signal. Therefore, the signal can have both positive and negative values, for example +/−0.5V. In an alternative embodiment, single ended signaling is used. A single ended signal uses only one signal that can vary, for example, from 0 to 1.5V.

A transmitter (not shown) can combine multiple signals into a single multiplexed signal 117. In one embodiment, the multiple signals are combined into a single high speed multiplexed signal. The multiplexed signal 117 can be sent to the receiver 107. The receiver 107 may include a set of first components 111 (e.g., a set of latched amplifiers, or any other devices capable of de-multiplexing signals and providing offset compensation to de-multiplexed signals). In one embodiment, the receiver 107 includes a voltage margin control 103 for voltage margin sweeps coupled to the set of first components 111. In one embodiment, the receiver 107 includes a set of offset compensation controllers 133 coupled to the set of first components 111. In one embodiment, each member of the set of offset compensation controllers 133 is trimmed for offset cancellation each time power is applied to the receiver 107.

In one embodiment, a logic processing unit 112 is connected to outputs of the set of first components 111. The logic processing unit 112 is provided to process received de-multiplexed signals 120, and to output processed signals 122. In one embodiment, the logic processing unit 112 includes a serial to parallel converter. The serial to parallel converter is used to slow down de-multiplexed signals and output slowed parallel signals for improved parallel signal operation. Alternatively, the logic processing unit 112 operates without a serial to parallel converter.

In one embodiment, an electrostatic discharge (ESD) 113 is connected in parallel to the receiver 107. In an alternative embodiment, the receiver 107 does not contain an ESD. The ESD 113 is a protective circuit that can prevent damage to the receiver when a surge occurs, such as from an electric static discharge. In one embodiment, when no surge is present, the ESD 113 has no appreciable effect on the receiver 107.

Figure 1B:
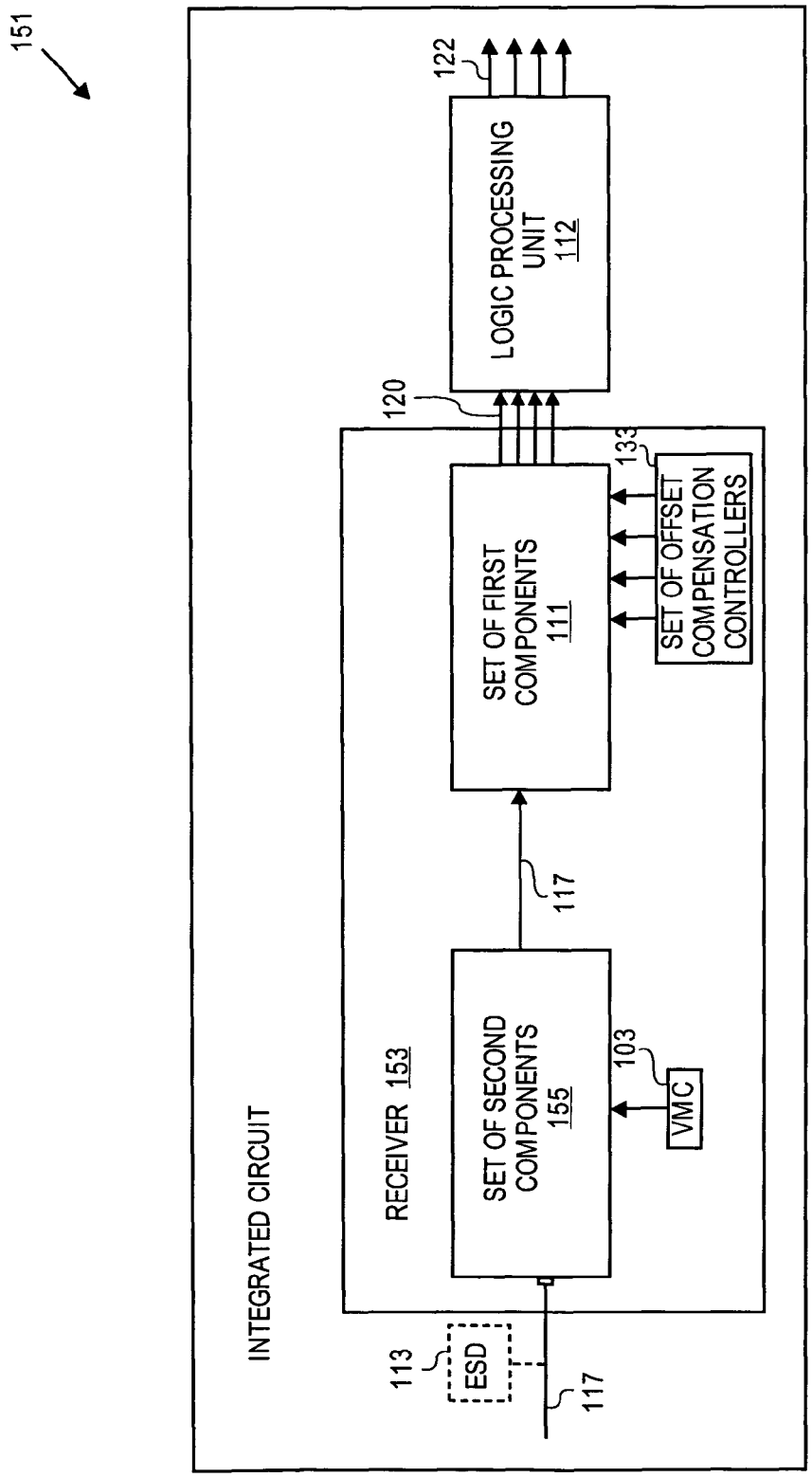
FIG. 1B is a block diagram of an integrated circuit in accordance with an alternative embodiment.

FIG. 1B is a block diagram illustrating an integrated circuit 151 in accordance with an alternative embodiment of the present invention. The integrated circuit 151 may include a receiver 153 for receiving signals. In one embodiment, the receiver 153 receives on chip signals. In alternative embodiments, the receiver 153 receives off chip signals and/or on chip signals.

In one embodiment, multiple signals are combined into a single high speed multiplexed signal 117, that can be sent to the receiver 153. The receiver 153 may include a set of first components 111 coupled to a second component 155. The set of first components 111 may be, for example, a set of latched amplifiers, or any other devices capable of de-multiplexing signals and providing offset compensation to de-multiplexed signals. The second component may be, for example, a variable offset comparator (VOC) or a preamplifier. In one embodiment, the receiver 153 includes a voltage margin control 103 for voltage margin sweeps coupled to the second component 155. In one embodiment, the second component is interposed between, and coupled to, the voltage margin control 103 and the set of first components 111. In one embodiment, the receiver 153 includes a set of offset compensation controllers 133 coupled to the set of first components 111. In one embodiment each member of the set of offset compensation controllers 133 is trimmed for offset cancellation each time power is applied to the receiver 153.

In one embodiment, a logic processing unit 112 is connected to outputs of the set of first components 111. In one embodiment, an electrostatic discharge (ESD) 113 is connected in parallel to the receiver 153. In one embodiment, when no surge is present, the ESD 113 has no appreciable effect on the receiver 153.

Figure 2A:
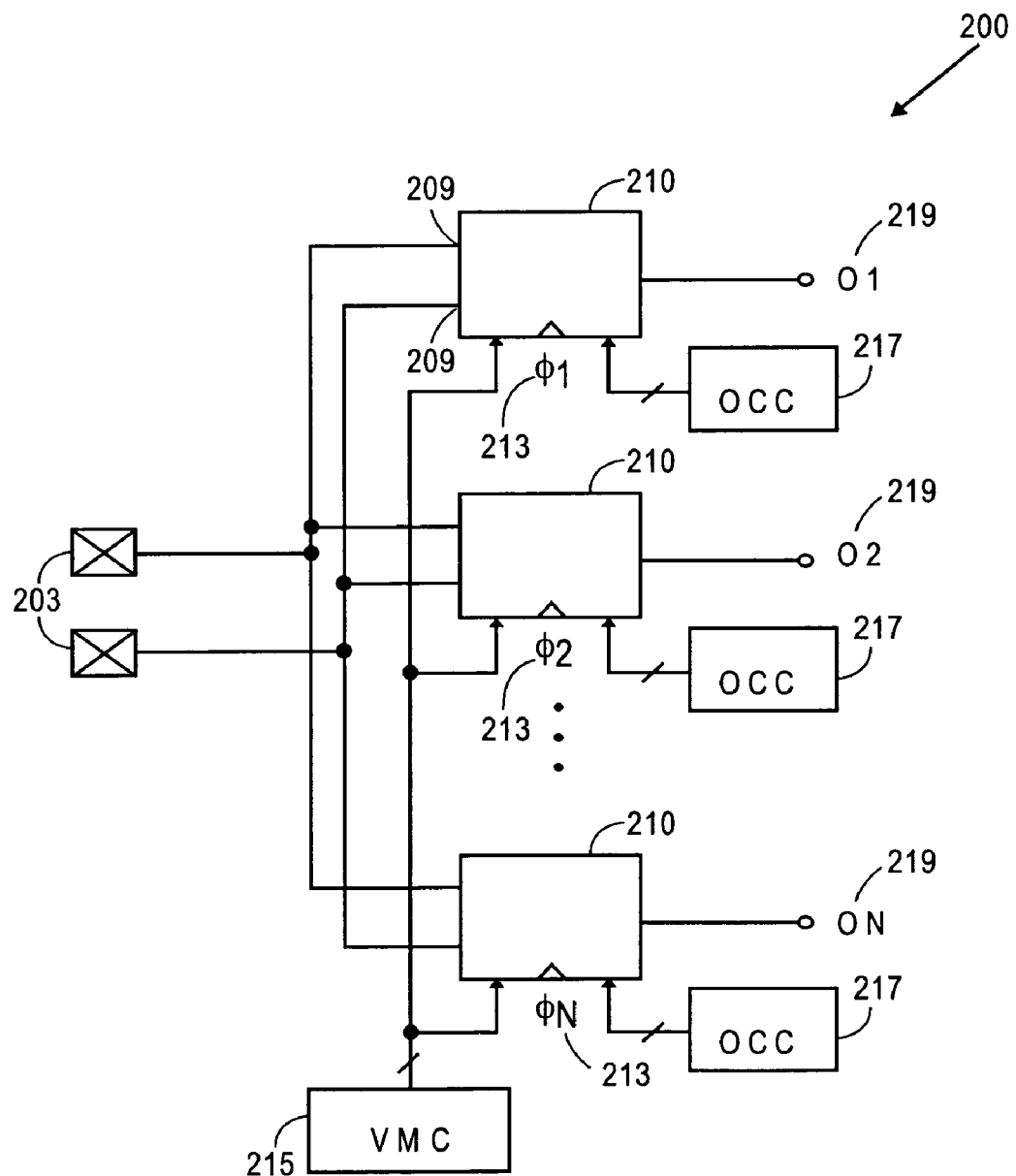
FIG. 2A is a circuit diagram of one embodiment of a receiver.

FIG. 2A illustrates a circuit diagram of a receiver 200 in accordance with one embodiment of the present invention. In one embodiment, the receiver 200 includes pads 203 connected to inputs 209 of multiple latched amplifiers 210. The pads 203 receive incoming signals and advance them to the latched amplifiers 210.

Each of the multiple latched amplifiers 210 may latch onto and output a portion of the multiplexed signal, thereby generating multiple de-multiplexed signals at latched amplifier outputs 219. In one embodiment, de-multiplexing occurs by latching onto portions of the multiplexed signal based on clock signals 213. A different phased shifted clock signal may be associated with each latched amplifier to determine which portions of the multiplexed signal are sampled by that latched amplifier. In one embodiment, phase locked loops (PLLs) or delay locked loops (DLLs) are used to generate the phase shifted clock signals.

A voltage margin control 215 is coupled to the multiple latched amplifiers 210. In one embodiment, the voltage margin control 215 is a global voltage margin control, and can provide voltage margining for the entire receiver 200. In operating mode, the voltage margin control 215 may be powered down to reduce power consumption of the receiver 200. In testing mode, a variable offset can be provided by the voltage margin control 215 to the multiple latched amplifiers 210. The variable offset determines a reference level of the receiver 200 that can be varied during testing to margin the receiver 200.

In one embodiment, each of the multiple latched amplifiers 210 is coupled to an offset compensation controller 217. In one embodiment, the offset compensation controller 217 is a local offset compensation controller, and provides offset compensation for the latched amplifier to which it is coupled. In operation, whether during testing or under operating conditions, the offset compensation controllers 217 may apply an offset voltage to the de-multiplexed signal at the output 219 of the latched amplifier 210.

By not having a VOC stage in the signal path, de-multiplexing a signal at multiple latched amplifiers 210, and separating the functions of voltage margin control and offset cancellation into different components, the device size and power consumption of the receiver circuit is minimized. In one embodiment, the total area occupied by the receiver 200 and total power consumption of the receiver 200 can be reduced by 75%. Voltage sensitivity and setup/hold time may also be improved by as much as 50% and 60%, respectively.

Figure 2B:
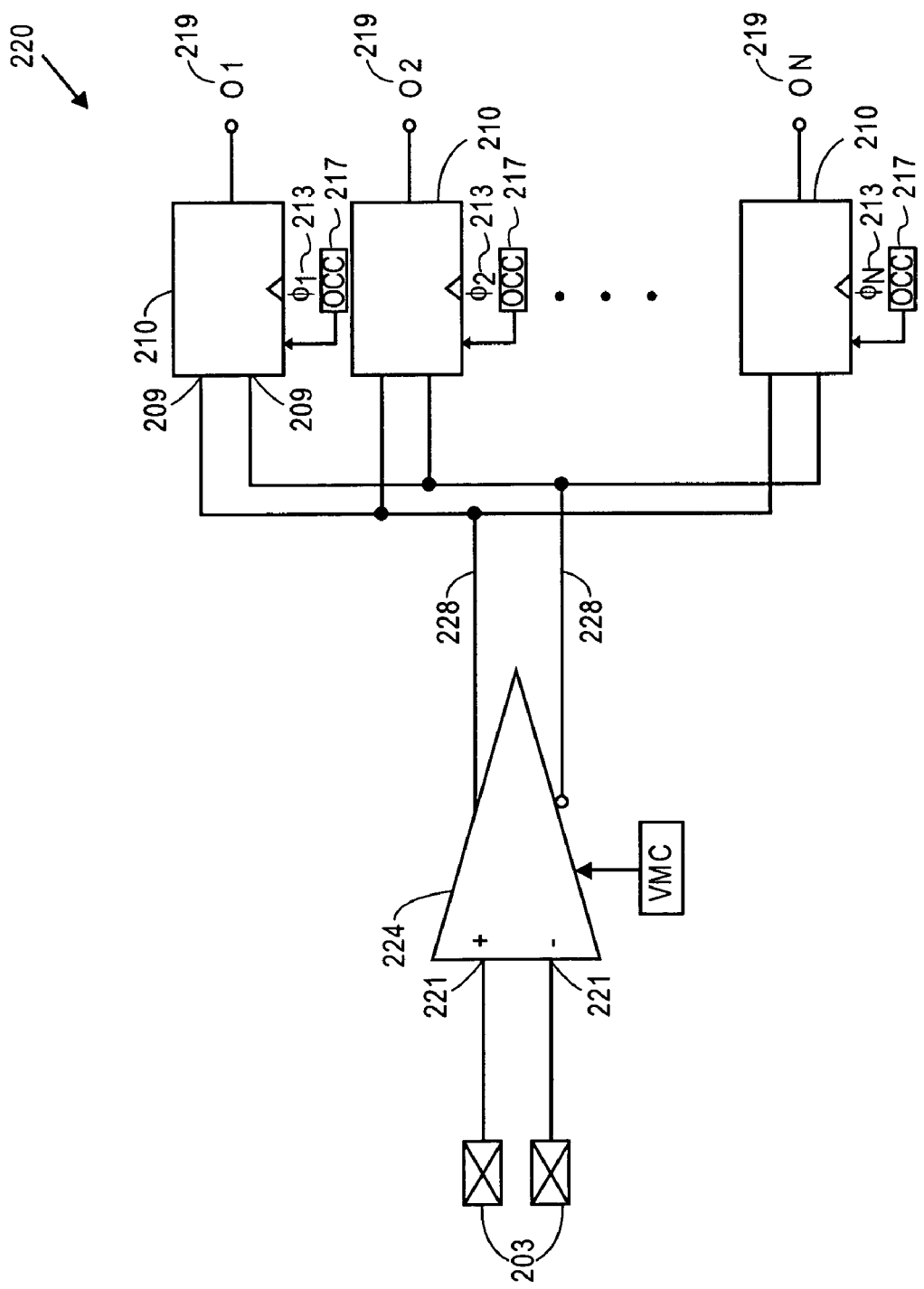
FIG. 2B is a circuit diagram of an alternative embodiment of a receiver.

FIG. 2B illustrates a circuit diagram of a receiver 220 in accordance with an alternative embodiment of the present invention. In one embodiment, the receiver 220 includes pads 203 connected to inputs 221 of a VOC 224. The pads 203 receive incoming signals and advance them to the VOC 224. In one embodiment, a voltage margin control 215 is coupled to the VOC 224. In operating mode, the voltage margin control 215 (VMC) may be disabled, and the VOC 224 may pass signals through its circuitry to its output 228 substantially unmodified. In testing mode, a variable offset can be provided by the VMC 215 to the VOC 324. The variable offset determines a reference level of the receiver 220 that can be varied during testing to margin the receiver 220.

Receiver 220 may further include multiple latched amplifiers 210 that have inputs 209 coupled to the outputs 228 of the VOC 224. In one embodiment, the multiple latched amplifiers 210 de-multiplex a multiplexed signal by latching onto portions of the multiplexed signal based on clock signals 213. In one embodiment, phase locked loops (PLLs) or delay locked loops (DLLs) are used to generate the phase shifted clock signals.

In one embodiment, each of the multiple latched amplifiers 210 is coupled to an offset compensation controller 217 (OCC). In operation, whether during testing or under operating conditions, the offset compensation controller 217 may apply an offset voltage to the de-multiplexed signal at the output 219 of the latched amplifier 210.

By de-multiplexing a signal at multiple latched amplifiers and separating the functions of voltage margin control and offset cancellation into different components, the device size and power consumption of the receiver circuit is minimized. In one embodiment, the total area occupied by the receiver can be reduced by 66% and the total power consumption can be reduced by 48%.

Figure 3:
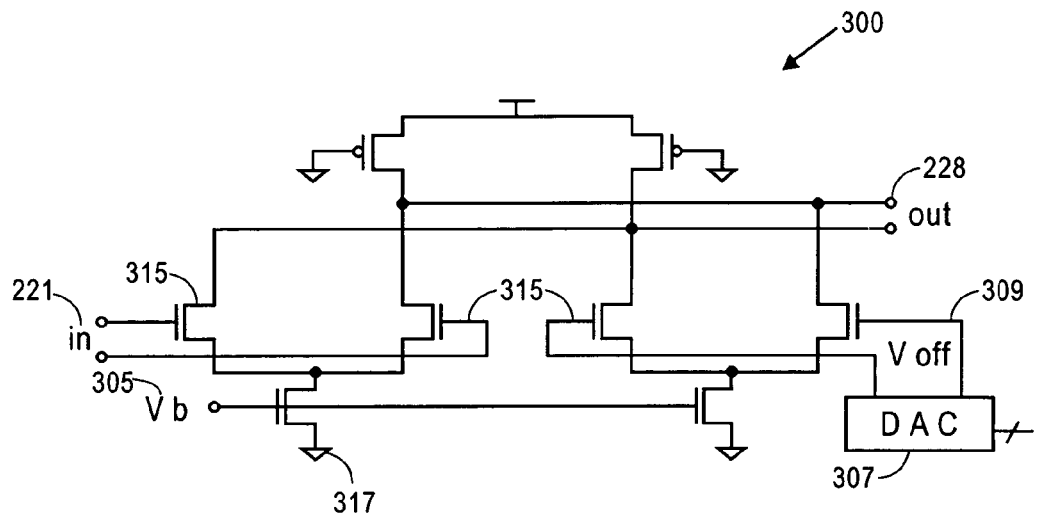
FIG. 3 illustrates a schematic of a variable offset comparator in accordance with one embodiment.

FIG. 3 illustrates a schematic of a VOC 300, in accordance with one embodiment of the present invention. In the illustrated embodiment, a voltage margin control is incorporated into the VOC 300. In alternative embodiments, the voltage margin control may be a separate component. The VOC 300 may include multiple transistors 315, and be coupled to a supply voltage 305 and a ground 317. The VOC 300 may have an input 221 to receive incoming signals and an output 228 to output received signals. In operating mode, the signal at the output 228 can be substantially the same as the signal at the input 221. In a testing mode, a digital to analog converter (DAC) 307 may be provided to act as the voltage margin control. In alternate embodiments, in which the voltage margin control is not part of a VOC, the voltage margin control comprises a DAC, and operates similarly to a voltage margin control incorporated into a VOC.

In testing mode, the DAC 307 outputs an offset voltage 309, which is applied to the output 228. The magnitude of the offset voltage 309 can determine the reference level of the VOC 300 and is dependant upon an offset code. In one embodiment, the offset code is received in an offset control input 311 of the DAC 307, and corresponds to a binary number whose range varies depending on the number of bits in the DAC 307. Each binary number may correspond to a particular voltage level. In the illustrated embodiment, an eight bit DAC 307 may be used as the margin control. When an eight bit DAC 307 is used, the variable reference level is a voltage that can be varied by changing the offset code fed to the VOC 300 from between 0 to 255. In alternative embodiments, where different sized DACs are implemented, the offset code fed to the VOC 300 may have different ranges.

Margining the receiver provides quality control and can substantially guarantee that the receiver will not fail in the field. In voltage margining, at least one known signal is generated and sent to the receiver. The known signal has a particular amplitude when sent. For example, the signal may range from −500 mV to +500 mV, and therefore have an amplitude of 1000 mV. The amplitude of the signal sent may be compared to the amplitude of the signal received. In one embodiment, to determine the amplitude of the signal received, the reference level can first be incrementally adjusted up until a change in state is registered. Next, the reference level can be incrementally adjusted down until a change in state is registered. Incremental adjustments of the reference level may be achieved by applying different offset codes to the DAC 307 through the offset control input 311. In one embodiment, an on chip global control (not illustrated) determines what offset codes to provide to the DAC 307.

In one embodiment, when the output changes states, the offset code that caused this change is captured and recorded. In one embodiment, the voltages at which the changes in states occur corresponds to the maximum and minimum voltages of the received signal, the difference of which is the received signal amplitude. In one embodiment, this difference is calculated once the maximum and minimum voltages have been recorded. When the amplitude of the received signal is too small, the margined device fails testing. When the amplitude is sufficiently large, the margined device passes testing, and can be shipped out to a customer.

One factor that determines the accuracy of a DAC is its resolution. Resolution is the smallest possible change in voltage at the output, otherwise known as step size. The offset resolution of the VOC 300 will impact the accuracy of the voltage margining. Smaller step size in the offset code translates into more accurate representations of the reference levels, which in turn yields more accurate voltage margining. Step size can be determined by dividing the full range of the DAC 307 by the possible number of states of the DAC 307. In one embodiment, the full range of the DAC 307 corresponds to the total possible amplitude (difference between the maximum amplitude and minimum amplitude).

In one embodiment, the DAC 307 that acts as the margin control is large enough (has enough bits) to cover the full range (total possible amplitude) of signals received at the input 221, and have a sufficiently fine resolution. For example, the total amplitude may be 1000 mV, and a step size of 4 mV may be sufficiently fine. Therefore, an 8 bit DAC 307 would be sufficiently large since it has 256 possible states, and 1000 mV/256 is equal to 4 mV. In one embodiment, the margin control is a large-range margin control (e.g., it can cover the full range necessary with sufficiently fine resolution).

In one embodiment, the VOC 300 is a preamplifier. In this embodiment, the preamplifier can amplify the signal under standard operating conditions and/or during a test mode. Amplifying the signal can improve subsequent signal recognition and signal resolution. In other embodiments, the VOC 300 does not amplify incoming signals. In these embodiments, when the VOC 300 is not in test mode, it passes signals through without modifying them, such as by providing an offset or amplification.

Figure 4A:
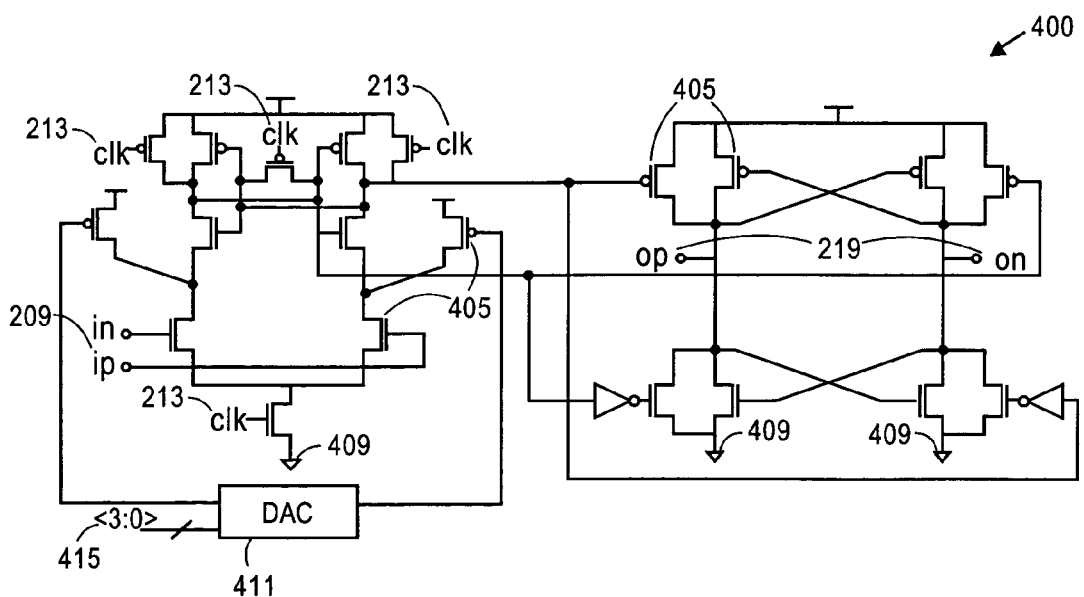
FIG. 4A illustrates a schematic of a latched amplifier in accordance with one embodiment.

FIG. 4A is a schematic of a latched amplifier 400 in accordance with one embodiment of the present invention. The latched amplifier 400 may include multiple transistors 405, and be connected to a clock signal 213 and a ground 409. In one embodiment, the clock signal 213 is a slow clock signal with a frequency that is equal to f/n, where f is the frequency of the multiplexed signal, and n is the number of latched amplifiers in the receiver.

The latched amplifier 400 may have an input 209 to receive multiplexed signals (e.g., from the VOC 205), and an output 219 to output de-multiplexed signals. In one embodiment, a DAC 411 is provided to act as the offset compensation controller. In the illustrated embodiment, the offset compensation controller is incorporated into the latched amplifier 400. In alternative embodiments, the offset compensation controller may comprise a separate component. The DAC 411 applies an offset voltage to the output 219. In one embodiment, the offset voltage is determined by calibrating the offset compensation controller in an initialization stage each time the receiver is powered on. During initialization, the latched amplifier may be tested to determine the voltage error (equal to the output voltage when the input is zero) at its output 219, which can be caused by, for example, an inherent mismatch in transistors. In one embodiment, the magnitude of the offset voltage is chosen such that the voltage error is compensated.

Offset cancellation values can change with time due to variables such as operating temperature, environment, bias, and changing circuit characteristics due to the age of the circuit. In one embodiment, the calibration procedure is used to address the above changes. In one embodiment, to account for changing voltage errors, the offset voltage can be modified each time the receiver is powered on. In alternative embodiments, calibration can occur more frequently, such as according to a predetermined time interval.

The magnitude of the offset voltage may vary based upon an offset code. In one embodiment, the offset code is received in an offset control input 415 of the DAC 411, and corresponds to a binary number whose range varies depending on the number of bits in the DAC 411. Each binary number corresponds to a particular voltage level. In the illustrated embodiment, a four bit DAC 411 is used as the offset compensation controller, and the offset voltage can be varied by changing the offset code fed to the latched amplifier from between 0 to 16. In alternative embodiments, where different sized DACs are implemented, the offset code fed to the latched amplifier may have different ranges.

In one embodiment, the size (number of bits) of the DAC 411 is large enough to provide an offset voltage that can compensate for most voltage errors and have a sufficiently fine resolution. In one embodiment, this value is determined during circuit design. In one embodiment, the size of the DAC 411 is large enough to compensate for substantially all voltage errors. In one example, substantially all voltage errors will be less than +/−32 mV, and a resolution of 4 mV is sufficiently fine. Therefore, a 4 bit DAC is sufficient since it has 16 different possible states. In one embodiment, the offset compensation controller is a small range offset compensation controller, (e.g., it is as small as possible, but can still compensate for substantially all voltage errors and have a sufficiently fine resolution).

Figure 4B:
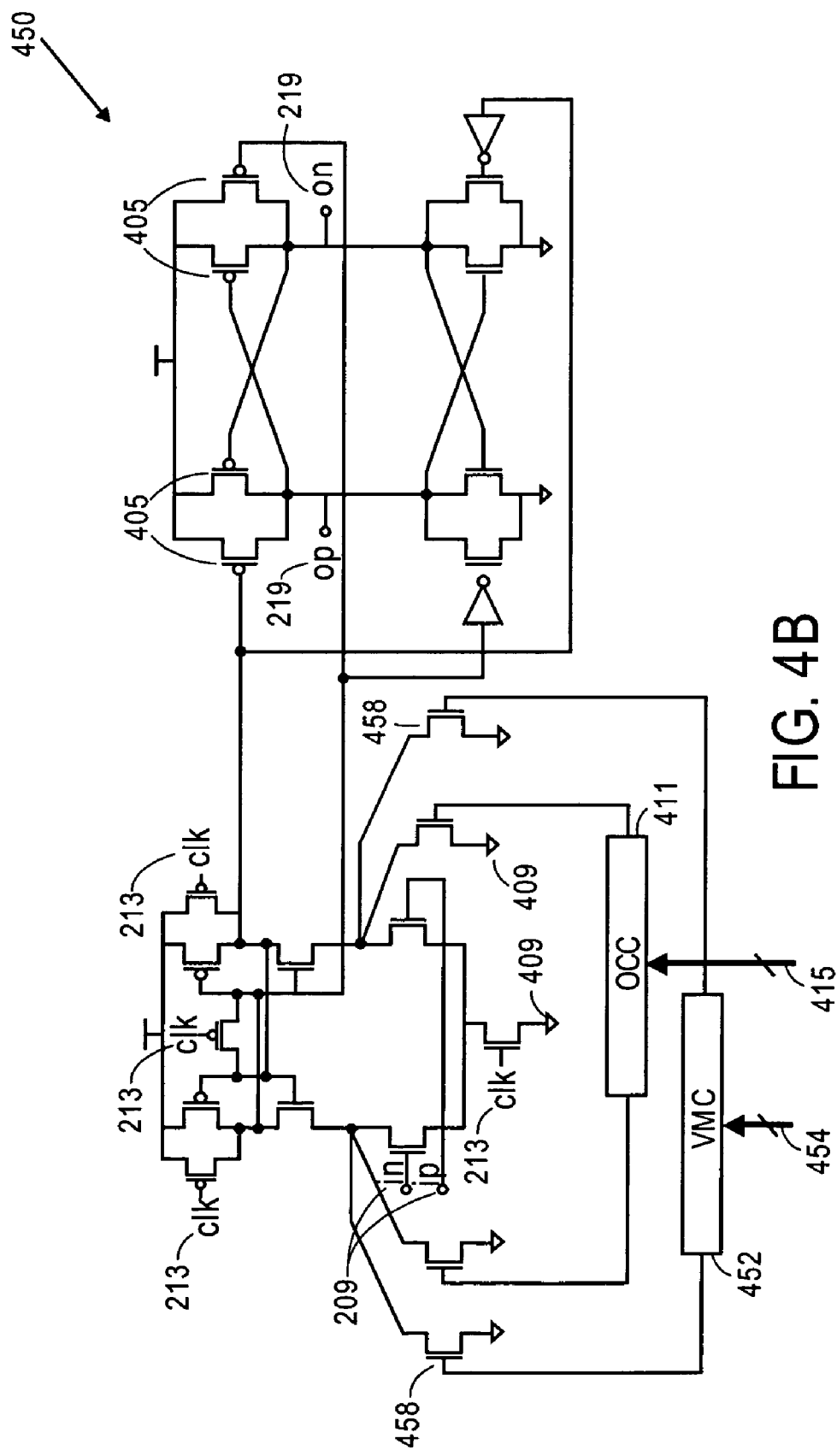
FIG. 4B illustrates a schematic of a latched amplifier in accordance with an alternative embodiment.

FIG. 4B illustrates a latched amplifier 450 in accordance with an alternative embodiment of the present invention. The latched amplifier 450 of FIG. 4B is similar to the latched amplifier 400 of FIG. 4A, with the addition of a voltage margin control 452 coupled to the latched amplifier 450 through additional transistors 458. No VOC is necessary in this embodiment since the voltage margin control 452 is coupled directly to the latched amplifier 450. In one embodiment, the voltage margin control 454 comprises a DAC. In one embodiment, during test mode, the magnitude of the offset voltage provided by the voltage margin control 452 may vary based upon an offset code. In one embodiment, the offset code is received in an offset control input 454 of the voltage margin control 452, and corresponds to a binary number whose range varies depending on the number of bits in the voltage margin control's DAC.

Figure 5A:
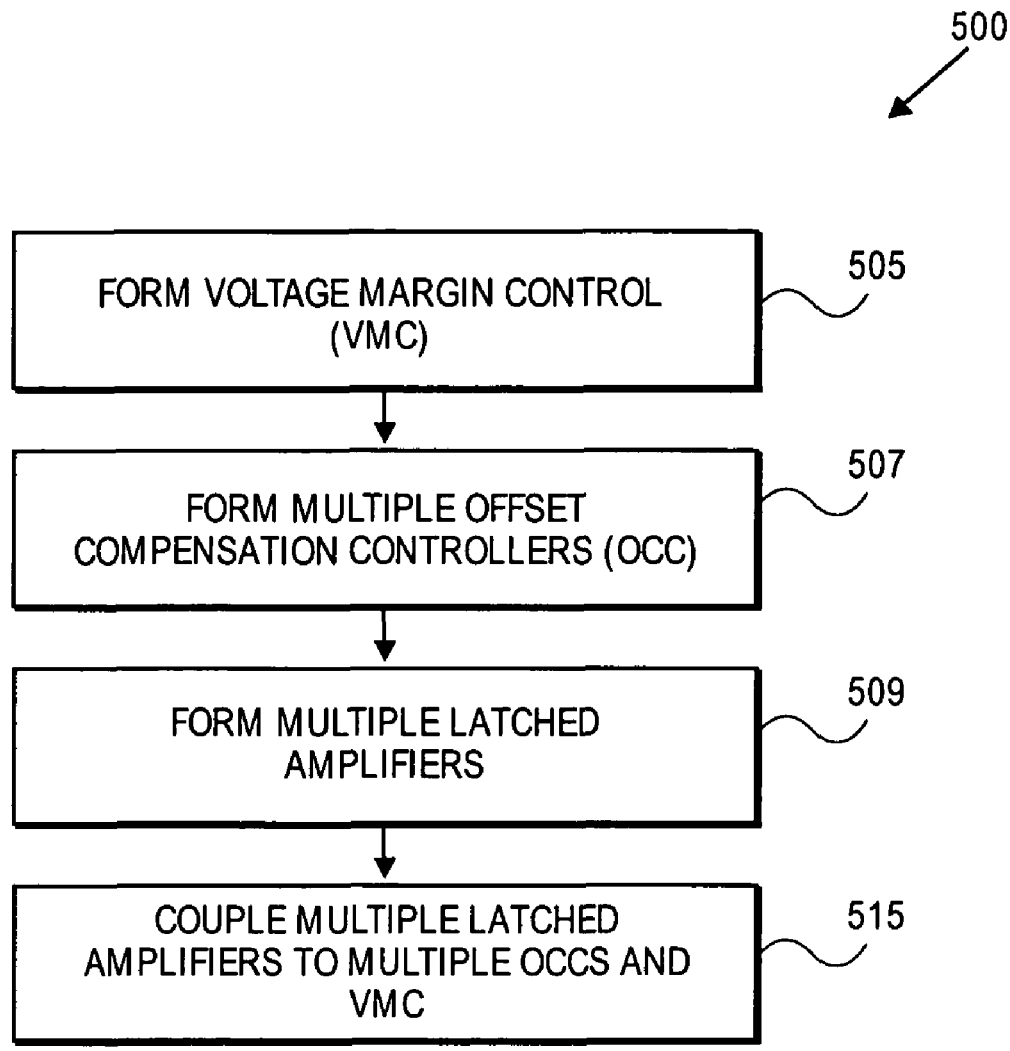
FIG. 5A is a flow diagram of one embodiment of a method for fabricating a receiver.

FIG. 5A illustrates a flow diagram of a method 500 for fabricating a receiver, in accordance with one embodiment of the present invention. At block 505, a voltage margin control is formed. At block 507, multiple offset compensation controllers are formed. At block 509, multiple latched amplifiers are formed. At block 515, the multiple latched amplifiers are coupled to the multiple offset compensation controllers and to the voltage margin control. In one embodiment, blocks 505, 507, 509 and 515 are performed concurrently. In alternative embodiments, they are performed separately.

Figure 5B:
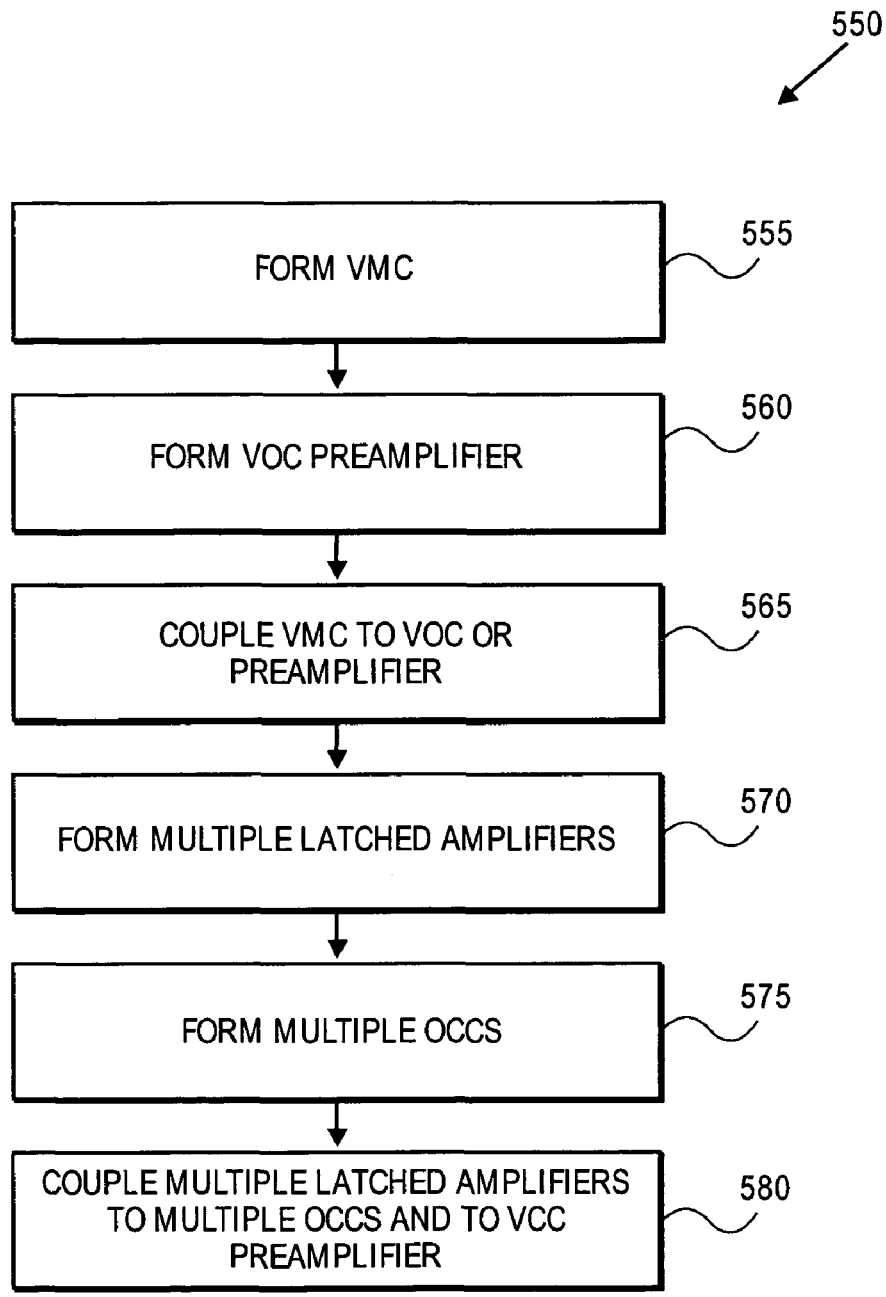
FIG. 5B is a flow diagram of an alternative embodiment of a method for fabricating a receiver.

FIG. 5B illustrates a flow diagram of a method 550 for fabricating a receiver, in accordance with an alternative embodiment of the present invention. At block 555, a voltage margin control is formed. At block 560, a variable offset comparator is formed. In one embodiment, the variable offset comparator is a preamplifier. At block 565, the variable offset comparator is coupled to the voltage margin control. In one embodiment, the variable offset comparator is incorporated into the variable offset comparator. At block 570, multiple latched amplifiers are formed. At block 575, multiple offset compensation controllers are formed. At block 580, the multiple latched amplifiers are coupled to the multiple offset compensation controllers and to the variable offset comparator. In one embodiment, the multiple offset compensation controllers are incorporated into the multiple latched amplifiers. In one embodiment, blocks 555 through 580 are performed concurrently. In alternative embodiments, they are performed separately.

Figure 6:
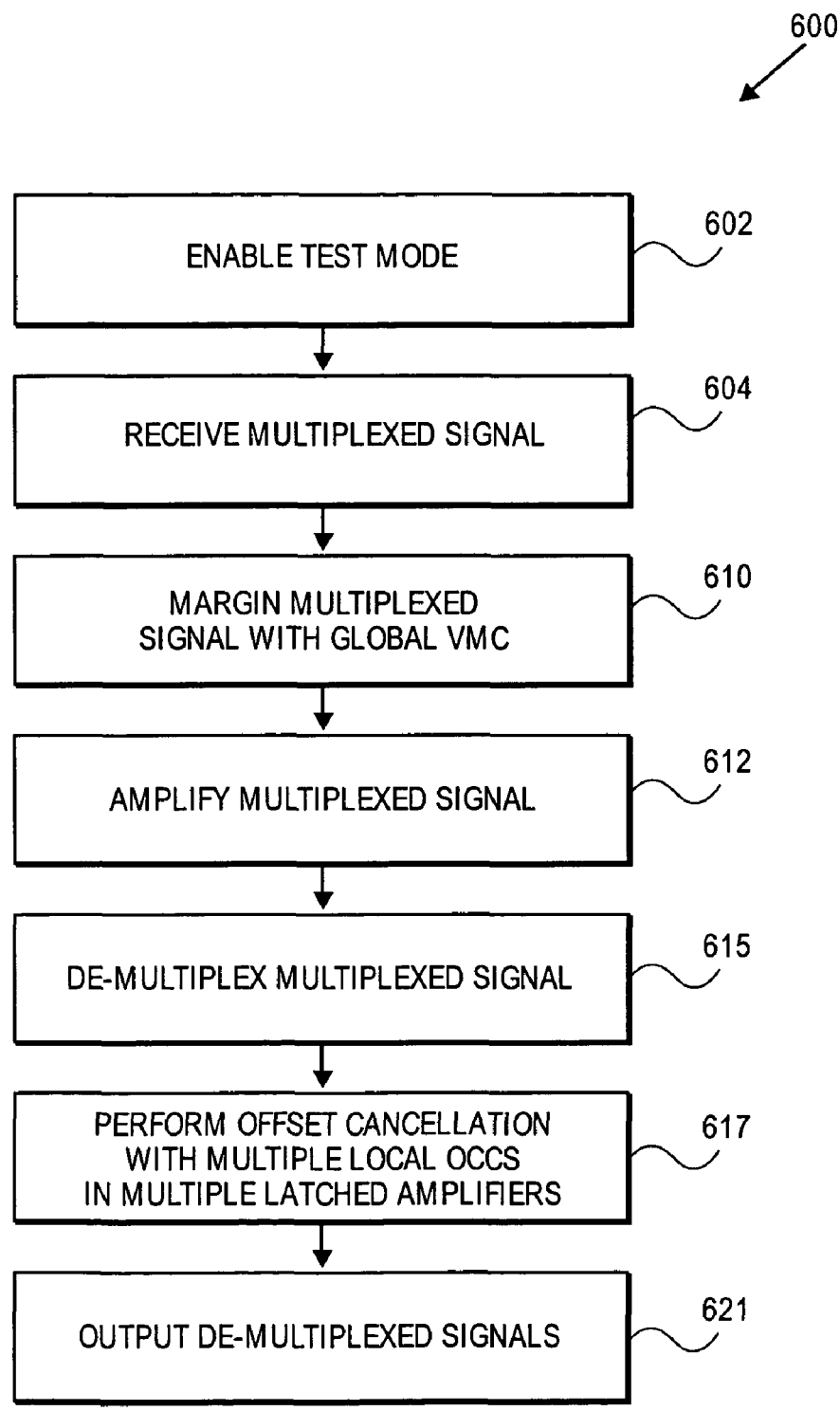
FIG. 6 is a flow diagram of one embodiment of a method for receiving a signal.

FIG. 6 illustrates a flow diagram of a method 600 for receiving a signal, in accordance with one embodiment of the present invention. At block 604, a multiplexed signal is received. In one embodiment the multiplexed signal is received by a VOC. In alternative embodiments, the multiplexed signal is received by multiple latched amplifiers. At block 612, if the multiplexed signal was received by a VOC, the multiplexed signal can be amplified in the VOC. In one embodiment, block 612 is executed only if the VOC is a preamplifier. At block 615, the multiplexed signal is de-multiplexed into multiple de-multiplexed signals. At block 617, offset cancellation is performed on the de-multiplexed signals in the multiple latched amplifiers with multiple local offset compensation controllers. At block 621, one of the de-multiplexed signals is output from each of the multiple latched amplifiers.

At block 602, a test mode is enabled. In one embodiment, the test mode is enabled, for example, after device fabrication.

In one embodiment the test mode is enabled to maintain quality control. If a test mode is enabled, at block 610, the multiplexed signal is margined with a global voltage margin control.

The foregoing embodiments of the invention have been presented for the purpose of illustration. Although the embodiments of the invention have been described by certain preceding examples, the invention is not to be construed as being limited by them. They are not intended to be exhaustive, or to limit the scope of the invention. Modifications, improvements and variations within the scope of the invention are possible in light of this disclosure.

What is claimed is:

1. A receiver, comprising:
a voltage margin control to provide voltage margining for the receiver;
a plurality of first components coupled to the voltage margin control; and
a plurality of offset compensation controllers, each of the plurality of offset compensation controllers coupled to one of the plurality of first components to provide offset voltage compensation, each of the plurality of offset compensation controllers trimmed for offset cancellation each time power is applied to the receiver.

2. The receiver of claim 1, further comprising:
a second component interposed between, and coupled to, the voltage margin control and the plurality of first components.

3. The receiver of claim 2, wherein:
the second component is one of a variable offset comparator or a preamplifier.

4. The receiver of claim 1, wherein:
the voltage margin control has a first digital to analog converter; and
each of the plurality of offset compensation controllers has a second digital to analog converter.

5. The receiver of claim 4, wherein the first digital to analog converter has a larger range than the second digital to analog converter.

6. The receiver of claim 1, wherein:
the plurality of first components is a plurality of latched amplifiers.

7. The receiver of claim 1, wherein:
the voltage margin control is a large-range global voltage margin control; and
each of the plurality of offset compensation controllers is a small-range offset compensation controller.

8. The receiver of claim 1, wherein:
each of the plurality of first components has an input to receive a multiplexed signal and an output to output a de-multiplexed signal; and
each of the plurality of offset comparators to apply an offset voltage to the output of one of the plurality of first components.

9. The receiver of claim 1, wherein:
the plurality of first components, the plurality of offset compensation controllers, and the voltage margin control are part of an integrated circuit.

10. The receiver of claim 9, wherein:
the voltage margin control is to be shut down during operation of the integrated circuit, while the plurality of offset compensation controllers remain active during operation of the integrated circuit.

11. The receiver of claim 1, wherein the voltage margin control to determine a maximum voltage level and a minimum voltage level of the receiver.

12. A method, comprising:

forming a voltage margin control, the voltage margin control to provide voltage margining for a receiver;

forming a plurality of offset compensation controllers;

forming a plurality of latched amplifiers;

coupling each of the plurality of latched amplifiers to the voltage margin control and to one of the plurality of offset compensation controllers; and in response to power being applied to the receiver, trimming each of the plurality of offset compensation controllers for offset cancellation.

13. The method of claim 12, wherein:

the voltage margin control is a large-range voltage margin control with a digital to analog converter; and each of the offset compensation controllers is a small-range offset compensation controller with digital to analog converter.

14. The method of, claim 12, further comprising:

forming at least one of a variable offset comparator or a preamplifier;

interposing the at least one of an offset compensation controller or a preamplifier between the voltage margin control and the plurality of latched amplifiers; and coupling the at least one of an offset compensation controller or a preamplifier to the voltage margin control and the plurality of latched amplifiers.

15. The method of claim 12, wherein forming the voltage margin control includes forming a digital to analog converter, and wherein forming the plurality of offset compensation controllers includes forming a plurality of additional digital to analog converters.

* * * * *